(12) United States Patent
Walsh

(10) Patent No.: US 6,586,054 B2
(45) Date of Patent: Jul. 1, 2003

(54) APPARATUS AND METHOD FOR SELECTIVELY DISTRIBUTING AND CONTROLLING A MEANS FOR IMPREGNATION OF FIBROUS ARTICLES

(75) Inventor: Shaw M. Walsh, Baltimore, MD (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 0 days.

(21) Appl. No.: 09/840,693

(22) Filed: Apr. 24, 2001

(65) Prior Publication Data
US 2002/0155186 A1 Oct. 24, 2002

(51) Int. Cl.⁷ .............................. B05D 1/18; B05D 3/02; B29C 67/00; B28B 5/00
(52) U.S. Cl. ................. 427/430.1; 427/294; 427/385.5; 264/101; 264/136; 264/137; 264/313
(58) Field of Search .............................. 427/430.1, 294, 427/385.5; 425/110, 169, 112, 389, 405.1, 546; 264/101, 136, 137, 313

(56) References Cited

U.S. PATENT DOCUMENTS

| | | | |
|---|---|---|---|
| 4,267,142 A | * 5/1981 | Lankheet | 264/102 |
| 4,902,215 A | 2/1990 | Seemann, III | 425/406 |
| 4,942,013 A | * 7/1990 | Palmer et al. | 156/285 |
| 5,052,906 A | 10/1991 | Seemann | 425/112 |
| 5,316,462 A | 5/1994 | Seemann | 425/112 |
| 5,702,663 A | * 12/1997 | Seemann | 264/258 |
| 5,885,513 A | * 3/1999 | Louderback et al. | 264/257 |
| 6,406,659 B1 | * 6/2002 | Lang et al. | 264/510 |

OTHER PUBLICATIONS

Rigas et al., "Development of a Novel Processing Technique for Vacuum Assisted Resin Transfer Molding (VARTM)", U.S. Army Research Lab, Aberdeen Proving Ground, MD, No Data provided.*

Vacrim Process Integrates Peripheral Vacuum Channel, Composites Technology Jan./Feb. 1998.

Wasteless Distrbution Medium: A New Development for the Resin Infusion Process, T. Wassenberg, W. Michaeli, Instituf Fur Kunstsroffverabeitung (IKV), PontstraBe 49, D–52062, Germany, pp. 2366–2369, 2000.

Parametric Study of Impregnation Behavior During Vacuum Assisted Resin Transfer Molding (VARTM), Shawn M. Walsh, Elias J. Rigas, Steven Nguyen, William Spurgeon and Dougleas J. Strand, US Army Research Lab, Aberdeen Proving Ground, MD, no date.

Development of a Novel Processing Technique for Vacuum Assited Resin Transfer Molding (VARTM), Elias J. Rigas, Shawn M. Walsh and Willima A. Spurgeon, U.S. Army Research Lab, Aberdeen Proving Ground, MD, no date.

* cited by examiner

Primary Examiner—Michael Barr
(74) Attorney, Agent, or Firm—Paul S. Clohan; William Randolph

(57) ABSTRACT

A process and apparatus for producing fiber reinforced resin structures using vacuum assisted resin transfer molding technology, wherein the apparatus and process employ a first fluid impervious flexible sheet containing therein a resin port; a fiber containing preform; a primary vacuum line; a resin channeling means; and a secondary vacuum line. The fluid impervious flexible sheet is placed over or around the fiber containing preform to form a chamber to which the primary vacuum line is connected. The resin channeling means is positioned on top of the fluid impervious flexible sheet, exterior to the chamber containing the preform in a fashion so as to form a pocket between or around the resin channeling means and said fluid impervious flexible sheet to which the secondary vacuum is applied. Activation of the secondary vacuum causes formation of channels in the fluid impervious flexible sheet. These channels increase the speed and efficiency of resin impregnation of the fiber containing preform.

11 Claims, 11 Drawing Sheets

ROLL OF FASTRAC MATERIAL

APPARATUS AND METHOD FOR SELECTIVELY DISTRIBUTING AND CONTROLLING A MEANS FOR IMPREGNATION OF FIBROUS ARTICLES

GOVERNMENT INTEREST

The invention described herein may be manufactured and used by or for the U.S. Government for governmental purposes without payment to me of any royalty thereon.

BACKGROUND OF THE INVENTION (1) Field of the Invention

The present invention relates to the manufacture of fiber-reinforced polymer composite articles. Specifically, the invention relates to an apparatus and method for the manufacture of fiber-reinforced polymer composite articles wherein the resin is selectively distributed and controlled during the impregnation stage of the fiber reinforced articles.

(2) Description of Related Art

Fiber reinforced polymer composite articles have been available and in use for some time. Interest in these materials is due in part to their lightweight, high stiffness and strength, and corrosion-resistant properties. The transportation industry, for instance, has shown interest in the manufacture and use of fiber reinforced polymer composite materials due to the potential for increased fuel savings and the potential to carry increased payloads due to the reduced weight offered by the use of these types of materials. The lightweight, corrosion-resistant nature of these composite articles has also attracted the interest of the construction/infrastructure sectors.

Unfortunately, one of the key barriers to use of fiber-reinforced polymer composite articles has been the cost of their manufacture. The cost of the manufacture is significantly due to the labor required to produce such articles as well as the material waste incidental to such manufacture. Use of fiber-reinforced resin structures is difficult to justify when an acceptable, metal-based alternative may be available, often at a fraction of the cost.

Vacuum assisted resin transfer molding technology (VARTM) has been employed in manufacturing fiber-reinforced polymer composite structures. Described simply, processes employing VARTM generally use (1) a preform (i.e., a mold containing reinforcing fibers therein or thereon) to be impregnated with a resin; (2) a fluid impervious, flexible sheet, liner or bag (generally referred to as vacuum bag); (3) a vacuum; and (4) resin. In a VARTM type process, the preform is prepared in the desired shape, having the desired reinforcing fiber content and geometry then covered with a fluid impervious flexible sheet, liner or bag in such a manner such as to form a seal around or on the preform (vacuum bag). The vacuum bag has a resin port through which resin may be introduced. Liquid resin is then introduced into the vacuum bag at one end of the preform. A vacuum is then applied to the interior of the vacuum bag at the opposite end of the preform from where the resin is being introduced so as draw the resin across the preform and to collapse the vacuum bag against the preform. Once the preform is fully infused, the resin-containing preform is then cured and the vacuum bag removed. Use of a vacuum assists in the flow of the liquid resin within the preform. A description of vacuum assisted or vacuum bag techniques used to form fiber reinforced plastic structures is set forth in U.S. Pat. No. 4,902,215; and the description set forth therein is incorporated herein by reference.

U.S. Pat. No. 4,902,215 (Seemann III), issued Feb. 20, 1990, describes and claims a VARTM process known in the art as SCRIMP (Seemanns Composite Resin Infusion Molding Process). In addition to employing a VARTM process as generally described above, SCRIMP further employs a resin distribution medium positioned between the fabric lay up and the fluid impervious, flexible outer sheet (i.e., vacuum bag). This distribution medium serves to enhance the uniform distribution of resin across the top and through the fiber lay up upon the application of a vacuum by keeping the upper surface of the lay up and the lower surface of the fluid impervious outer sheet apart. In order to enhance the separation of the completed resin impregnated fiber lay up from the mold surface and the vacuum bag, porous peel plies which do not adhere to the resin are provided between the distribution media and the fiber lay up. After the resin has cured, the vacuum inlet is cut off, and the fluid impervious outer sheet, the distribution medium and peel ply are peeled from the fiber reinforced plastic structure.

U.S. Pat. No. 5,052,906 (Seemann), issued Oct. 1, 1991, describes and claims a modification/improvement to the claimed invention of Seemann, III '215, described above. In order to facilitate resin flow, this patent describes the use of two resin distribution layers as opposed to one. One of said layers is placed/located on the mold surface per se, beneath the lower face of the fiber lay up, and the other on top of the fiber lay up, between the fiber lay up and the fluid impervious outer sheet. After the resin has been cured, the impervious outer sheet, the distribution mediums and peel plies are peeled from the resulting fiber reinforced structure (fiber reinforced lay up).

The VARTM processes described in these patents require the installation of distribution layer(s), peel ply, and, in some cases, a breather layer to ensure proper vacuum application during resin impregnation. These layers are used to provide a preferential flow path for the resin during the process and are disposable. Installation and removal of these materials can be time consuming and costly due to the specific labor involved. Furthermore, these layers become contaminated with resin as part of the impregnation process. Hence, these layers must be disposed of along with any residual resin that remains affixed to these consumable materials. It would be desirable to reduce the waste and labor associated with the manufacture of fiber reinforced resin structures using vacuum techniques.

U.S. Pat. No. 5,316,462 (Seemann), issued May 31, 1994, describes a VARTM process that does not employ a distribution medium of the type described above. Seemann '462 describes and claims a unitary vacuum bag for use in forming fiber reinforced composite articles wherein the vacuum bag integrates the features of resin distribution and vacuum draw. For instance, U.S. Pat. No. '462 describes that a multiplicity of cross channels may be formed on the inner surface of the vacuum bag to facilitate resin distribution. The vacuum bag taught may be cleaned and reused. The resulting fiber reinforced composite article would have embedded thereon an impression of these cross channels.

There remains a need to improve the VARTM type apparatus and processes. The present invention does not require the installation and removal of consumable resin distribution layers. Moreover, the present invention provides for superior resin flow paths using a novel means for establishing resin flow channels and provides for the resulting fiber reinforced composite article having a smooth surface thereon.

SUMMARY OF THE INVENTION

The present invention provides an apparatus and method for the manufacture of fiber-reinforced polymer composite articles using vacuum assisted resin transfer molding technology wherein some of the steps, labor and material waste associated with conventional, prior art VARTM manufacturing techniques are eliminated.

The process of the present invention has been termed FASTRAC, which refers to Fast Remotely Actuated Channeling. The FASTRAC process is a unique process that employs VARTM techniques in the general sense and operates without a traditional resin distribution medium. The FASTRAC process and apparatus employ a fluid impervious flexible outer sheet of the type referred to in the prior art in order to create a chamber around a fiber containing preform within which a vacuum can be applied via a primary vacuum line. This fluid impervious, flexible outer sheet is referred to herein as "primary vacuum bag."The primary vacuum bag is used to seal a fiber containing preform to be impregnated with a resin to a mold (tool) surface. In the FASTRAC process and apparatus herein, the primary vacuum bag itself acts as the resin distribution medium via remote actuated channeling.

Once the primary vacuum bag has been installed, a resin channeling means (also referred to herein as FASTRAC layer) is placed on top of the primary vacuum bag that is in contact with the preform and a pocket created between and/or around the FASTRAC layer and the primary vacuum bag to which a second vacuum (also referred to herein as secondary vacuum) may be applied via a secondary vacuum line. The pocket is formed in a fashion so that upon activation of the secondary vacuum line, the primary vacuum bag is drawn up to the FASTRAC layer and caused to assume the channel configuration of the FASTRAC layer. How the pocket between the resin channeling means and the primary vacuum bag is formed may vary depending on the specific configuration of the resin channeling means employed.

The resin channeling means may be any means that when positioned on top of the primary vacuum bag and a secondary vacuum applied between and/or around said resin channeling means and the primary vacuum bag, the primary vacuum bag is caused to be drawn up into and/or around the resin channeling means and assume a channel configuration. The resin channeling means may, for example, be comprised of a rigid or semi rigid component part in the shape of a panel or strip having channels molded or machined thereon; it may be comprised of one or more rigid or semi rigid component parts in the shape of strips (with no channels molded thereon) positioned on top of the primary vacuum bag in a set configuration; or it may be one or more cords positioned on top of the primary vacuum bag to form a specific design. There is no limit as to what one may employ as the resin channeling means so long as the function described herein, that of forming channels in the primary vacuum bag (referred to herein as FASTRAC channels) as described, is achieved.

The pocket between and/or around the FASTRAC layer and the primary vacuum bag may be formed in a variety of manners. For instance, if the FASTRAC layer is a semi rigid solid strip or sheet having channels molded therein, the perimeter of this type of FASTRAC layer may be sealed to the primary vacuum bag, for instance, using conventional sealing means such as adhesives, duct tape, O-ring, etc. to form the pocket. If the FASTRAC layer, for example, comprises one or more cords positioned on the primary vacuum bag so as to generate a channel pattern on the primary vacuum bag, a second vacuum bag may be placed over the FASTRAC layer and the primary vacuum bag and sealed so as to provide a pocket within which a secondary vacuum may be applied. One having ordinary skill in the art would realize that use of a second vacuum bag as described may also be employed when the FASTRAC layer is a solid strip or sheet having channels molded therein. One having ordinary skill in the art, in view of the description of the invention herein, will be able to determine a variety of methods in which to form a pocket between a FASTRAC layer and the primary vacuum bag so that a secondary vacuum may be applied therein.

When a vacuum is drawn between the FASTRAC layer and the primary vacuum bag via a secondary vacuum line (also referred to herein as FASTRAC vacuum line), the primary vacuum bag is caused to be drawn up into or around the FASTRAC layer and assume the shape of channels. The channels formed in the primary vacuum bag are referred to herein as FASTRAC channels. As long as sufficient pressure drop is created between the FASTRAC layer and the primary vacuum bag via the secondary vacuum line, the temporary FASTRAC channels assumed by the primary vacuum bag remain in place.

In the practice of the present invention, once the FASTRAC layer has been set in place as described above, the primary vacuum line initiated, and the FASTRAC channels formed, resin is introduced into the primary vacuum bag via one or more resin input ports positioned beneath the FASTRAC layer so as to facilitate the flow of the resin along the fiber containing preform via the FASTRAC channels created. It is the FASTRAC channels created that assist in the distribution of the resin allowing the resin to flow across and then through the thickness of the preform once resin infusion is initiated.

During the exercise of the present invention, the vacuum differential between the primary and secondary vacuum lines can be adjusted so as to control the flow rate of the resin in the formed FASTRAC channels. For instance, slowly releasing the vacuum draw of the secondary vacuum line effects the shape and size of the FASTRAC channels assumed by the primary vacuum bag; and, hence effects the flow rate of the resin introduced into the preform. Once resin infusion of the preform is near complete, the secondary vacuum line is gradually released resulting in less defined FASTRAC channels which acts to slow the rate of resin flow to the preform. Upon complete resin impregnation of the preform, the secondary vacuum line is fully released causing the primary vacuum bag to no longer assume fretain any channel shape associated with the FASTRAC layer. The FASTRAC process thus uniquely eliminates these resin feed channels. Once the vacuum draw created by the secondary vacuum line has been completely eliminated, the primary vacuum bag is relaxed and collapses against the preform as a result of the vacuum draw present via operation of the primary vacuum line. Collapse of the primary vacuum bag forces the resin to remain within the shape of the fiber containing preform and helps create a smooth resin finish on the surface of the preform. The resin impregnated fiber containing preform may then be cured. Once cured, the primary vacuum bag is removed.

Throughout the above process, the primary vacuum line has been in operation facilitating the flow of the resin material through the fiber-containing preform. One having ordinary skill in the art would realize the most suitable location in which to position the primary vacuum line and the most suitable vacuum strength to employ so as to optimize resin impregnation of the preform.

Moreover, in exercising the present invention, one having ordinary skill in the art would recognize that the pressure differential beneath the primary vacuum bag and above the primary vacuum bag determines the formation, or lack thereof, of FASTRAC channels in the primary vacuum bag. One having ordinary skill in the art would recognize that it is essential that the pressure differential beneath the primary vacuum bag and above the primary vacuum bag must always be such as to permit the primary vacuum bag to conform to the shape of the FASTRAC channels in order to optimize/maximize resin flow to the preform. Vacuum levels are ideally 30" Hg, but, more realistically, commercially available vacuum pumps supply a vacuum level of between 28–29" Hg. Other vacuum levels may be employed herein. One having ordinary skill in the art will recognize that in the exercise of the present invention it is not the vacuum levels per se that are critical, but the pressure differential between the pressure beneath the primary vacuum bag and above the primary vacuum bag that is critical in operation of the invention. This may be adjusted so as to accommodate the specific needs of one practicing the invention.

It is an object of the present invention to provide a resin distribution system having superior performance as compared to conventional VARTM technology.

It is an object of the present invention to provide a novel and flexible means for establishing resin flow channels in a VARTM type process.

An object of the present invention is to provide an apparatus and method for the manufacture of fiber-reinforced polymer composite articles employing resin channeling means that do not come into direct contact with the resin.

It is an object of the present invention to provide an apparatus and method for the manufacture of fiber-reinforced polymer composite articles using vacuum assisted resin transfer wherein excess waste is reduced and/or eliminated.

A further object of the invention is to provide an apparatus and method for the manufacture of fiber-reinforced polymer composite articles using vacuum assisted resin transfer technology wherein labor associated with the fabrication of said articles is reduced.

A further object of the invention is to provide a vacuum assisted resin distribution system having a means for actively steering the resin flow front to minimize or eliminate resin waste and to minimize total resin fill time of fiber reinforced articles.

Still a further object of the present invention is to provide a means for separately establishing and controlling both the resin impregnation pressure differential and local flow channel permeability.

Yet a further object of the invention is to provide modular means for rapidly configuring resin flow paths.

The means to achieve these and other objectives of the present invention will be apparent from the following detailed description of the invention, drawings and claims.

BRIEF DESCRIPTION OF THE DRAWINGS

In the drawings:

FIG. 1 is a detailed, front view, schematic drawing illustrating the FASTRAC apparatus of the present invention.

FIG. 4 illustrates an embodiment of how the FASTRAC channels may be formed.

FIG. 5 illustrates a detailed view of a resin supply interface between the FASTRAC layer and the primary vacuum bag.

DETAILED DESCRIPTION OF THE INVENTION

The present invention provides an apparatus and method for efficiently manufacturing fiber-reinforced polymer composite articles using vacuum assisted resin transfer molding technology. The invention is described herein with reference to the drawings.

Figure 1A:
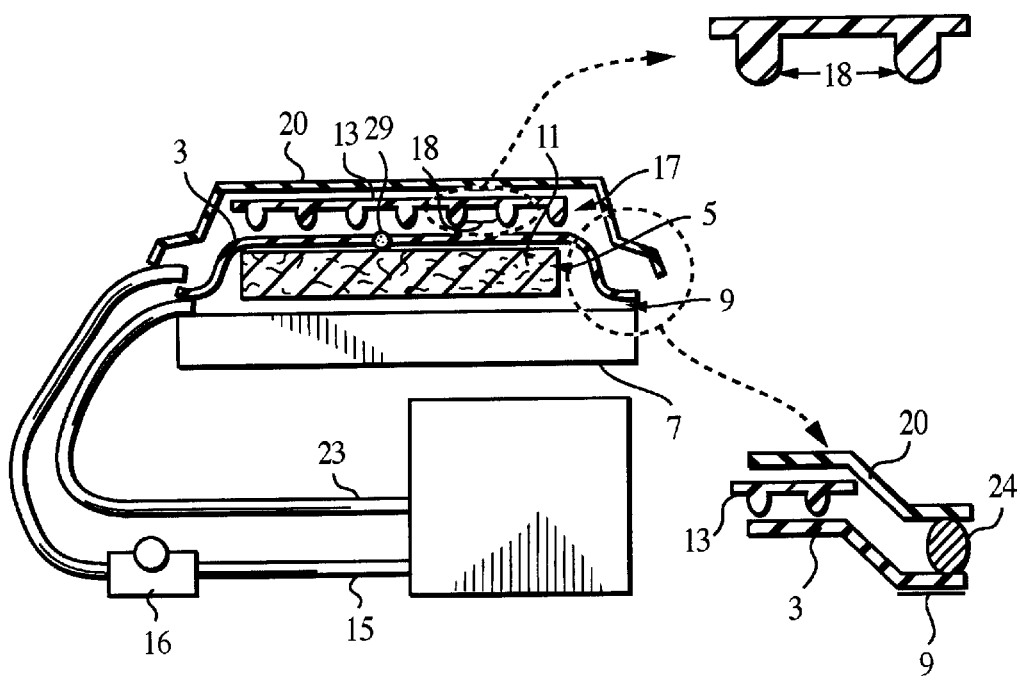
FIG. 1(a) illustrates the apparatus prior to activation of the secondary vacuum line.
Figure 1B:
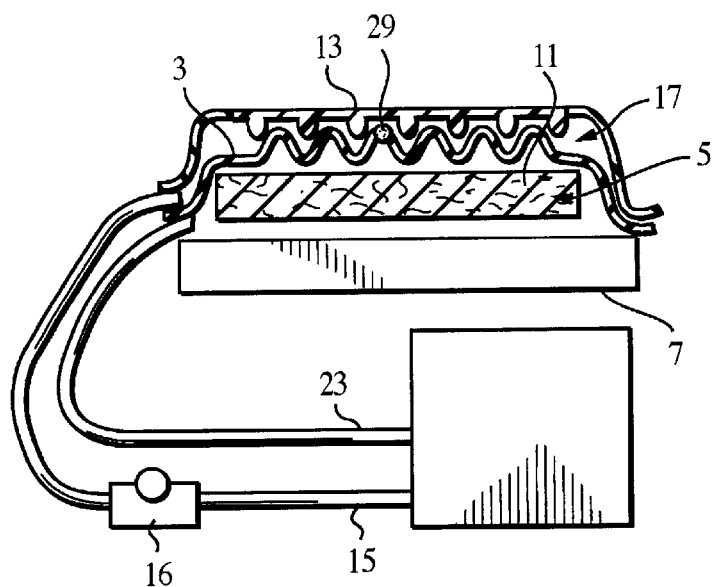
FIG. 1(b) illustrates the apparatus during activation of the secondary vacuum line.
Figure 2:
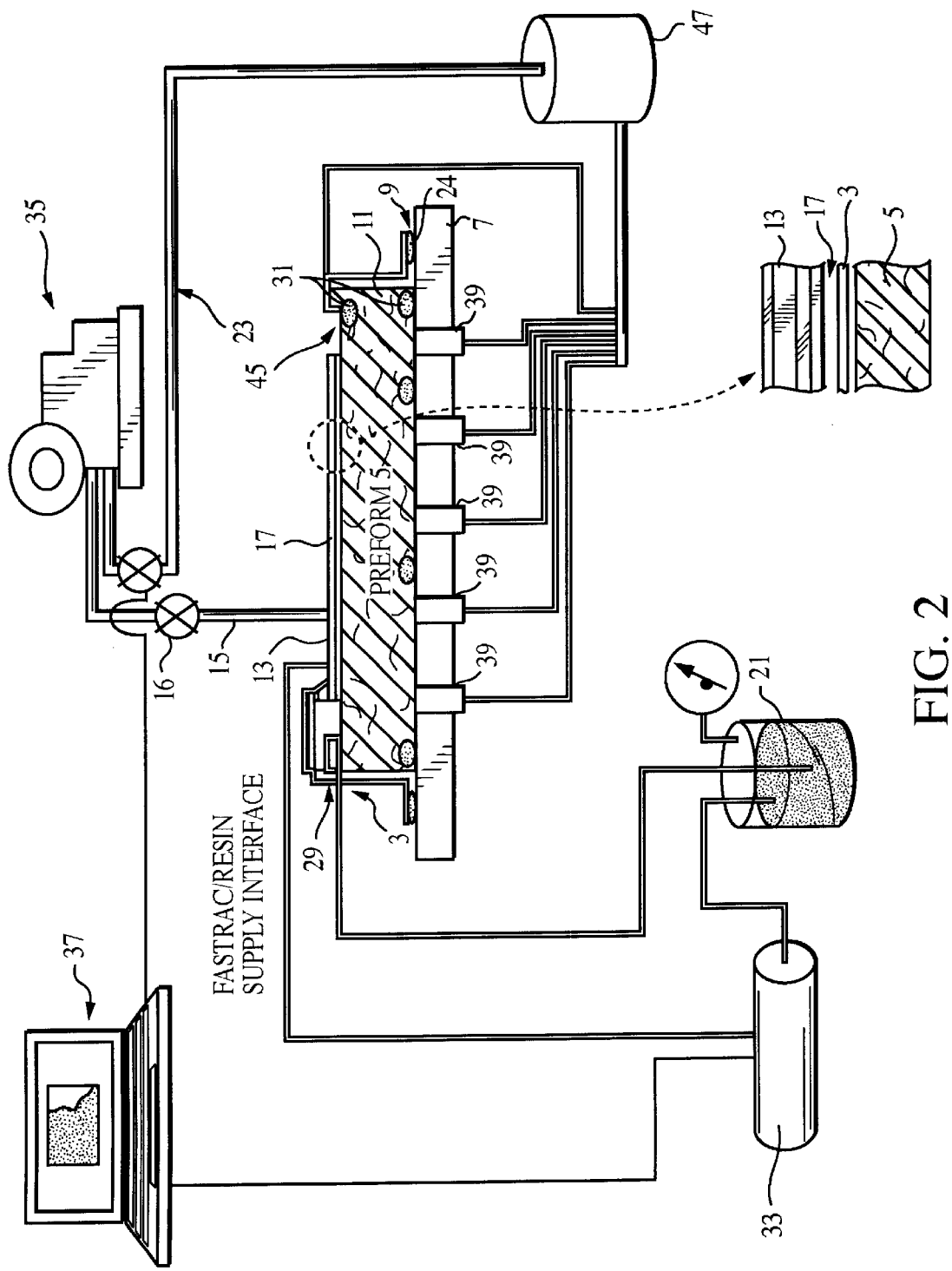
FIG. 2 is a detailed, side view, schematic drawing of a FASTRAC apparatus and process of the present invention, wherein optional resin flow sensors, an optional computer-based control system and optional auxiliary vacuum lines are employed.

The FASTRAC process is a VARTM type process that operates without the use of a traditional resin transfer medium which is in direct contact with a fiber preform. FIG. 1 is a basic representation of the invention; while, FIG. 2 is a representation of the present invention employing optional features that will be specifically described. Reference is made to FIGS. 1 and 2 to illustrate and describe the FASTRAC apparatus and process of the present invention. The present invention employs a flexible, fluid impervious outer sheet, liner or bag 3 to cover or surround a fiber containing preform 5 to be impregnated with resin so as to create a sealed chamber around said preform 5 to which a vacuum may be applied. This flexible, fluid impervious sheet, liner or bag 3 is referred to herein as "primary vacuum bag." The primary vacuum bag 3 contains a resin port 29 positioned beneath FASTRAC layer 13 through which resin is introduced into said preform 5. In the present invention, it is the primary vacuum bag 3 that is employed to assist in the flow and transfer of resin to and throughout preform 5 during impregnation. If a flexible, fluid impervious sheet or liner 3 is employed as the primary vacuum bag (as illustrated in FIGS. 1 and 2), the sheet or liner may be clamped or sealed to tool surface 7 along its perimeter 9 using conventional clamping or sealing means 24 so as to create a sealed chamber within which a primary vacuum 23 may be applied. Adhesives, such as epoxy, RTV, thermal sealants, and the like may be used to facilitate the sealing of a flexible, fluid impervious sheet or liner 3 to said tool surface 7. If a flexible, fluid impervious bag is used, the fiber containing preform 5 would be placed therein. The primary vacuum liner or bag 3 employed may be disposable or reusable and may be constructed from any fluid impervious, pliable, non-stick materials. For example, the primary vacuum bag may be constructed from commercially available materials including polypropylene, rubber, silicone, Kapran, impervious Teflon®, and the like. It would be obvious to one skilled in the art that high temperature materials may be used to construct the primary vacuum bag 3 depending on the application.

A fiber containing preform 5, as used herein, refers to a fiber containing structure on a mold or tool surface 7 or a stand alone mold cavity containing therein reinforcing fibers 11, wherein said fibers 11 may be made of materials such as graphite, fiberglass, glass, Kevlar®, boron and the like. Materials which may be employed as the reinforcing fibers also include engineered preform materials such as chopped strand mat, woven fabrics, non-woven fabrics, braided fibers, stitched fabrics, binder-based fabrics, etc.

In the FASTRAC process, once the primary vacuum bag 3 has been installed as described above, a resin channeling means 13 (also referred to as "FASTRAC layer") composed of, for example, a rigid or semi rigid material having channels 18 thereon is placed, channels 18 faced down, on top of the primary vacuum bag 3 and a pocket 17 formed. In the operation of the present invention, it is critical that a pocket 17 be formed between and/or around said FASTRAC layer 13 and the outer surface of primary vacuum bag 3 so that a secondary vacuum line 15 may be applied therein 17 so as to cause the primary vacuum bag 3 to assume the channel configuration of FASTRAC layer 13. The pocket 17 may be formed by installing a second vacuum bag 20, as illustrated in FIG. 1, over said FASTRAC layer 13 and the primary vacuum bag 3. It may be sealed via conventional clamping or sealing means 24. As an alternative, the pocket could also be formed by sealing the edges of the FASTRAC layer 13 itself to the primary vacuum bag 3 using adhesives or tape (not shown) and hence a second vacuum bag 20 is not needed. This alternative method of forming a pocket 17 is used in FIG. 2. The pocket may be formed in any suitable manner.

The FASTRAC layer 13 illustrated may be in the form of strips, sheets or panels and may be in any variety of shapes and sizes. The dimensions of the channels 18 (i.e., width, depth, shape—see FIG. 4, for example) to employ in the FASTRAC layer 13 may vary and selection of the dimensions to employ would depend on (1) the viscosity of the resin to be employed in the impregnation process; (2) the permeability of the reinforcing fibers 11 employed in the preform 5; (3) the pressure drop created by the primary vacuum 23 employed; and (4) the geometry of the preform 5 to be impregnated. The FASTRAC layer 13 and the channels therein 18 may be made in any configuration. Generally, however, the channels 18 are parallel (see, for example, FIG. 4 and FIG. 6) and may have sharp corners (square-like configuration as illustrated in FIG. 4) or have a rounded configuration (hemi-spherical in shape). The dimensions of the FASTRAC channels 18 may, for example only, have a width of 0.5" to 0.75" and a depth of 0.25" to 0.4". One may tailor the configuration of the FASTRAC layer 13 and channels 18 based on how one wishes the resin to flow during impregnation. The length of the FASTRAC layer 13 may be as long as the part (preform 5) to be processed although it need not be. Preferably, as shown in FIG. 2, the length of the FASTRAC layer 13 is slightly shorter than the length of the preform 5 so as to create a shunting area 45 to minimize premature arrival of resin flow front to the primary vacuum line 23. Premature arrival of resin to the primary vacuum line 23 would impair the ability of the primary vacuum line 23 to facilitate complete resin impregnation of the preform 5. One having ordinary skill in the art, with knowledge of the four (4) considerations outlined above, would be able to select the channel dimensions, channel shape and FASTRAC layer shape and size to employ in order to best optimize the flow of resin using the present invention. Readily available mold materials having channels therein may be used as the FASTRAC layer; or FASTRAC layers may be customized and molded to specific specifications using, for example, conventional machining techniques. The FASTRAC layer may be made of a variety of rigid or semi-rigid materials such as polypropylene, rubber, silicone, formed metal or plastic, machined Lexan® (General Electric Company, New York), wood, and the like. The manufacture of the FASTRAC layer may be accomplished using a variety of materials and techniques.

Once a preferable channel pattern, shape and material for the FASTRAC layer 13 has been determined, purchased or fabricated, and the FASTRAC layer 13 placed over the primary vacuum bag 3 as described, a secondary vacuum line 15 is positioned so as to provide vacuum draw to said pocket 17 formed between and/or around FASTRAC layer 13 and primary vacuum bag 3.

Primary vacuum line 23 and secondary vacuum line 15 are then activated. Activation of the secondary vacuum line 15 causes the compliant primary vacuum bag 3 to be drawn up into the FASTRAC layer 13 and to assume the shape of the FASTRAC channels 18 (see FIG. 1(*b*)). Resin is then supplied through primary vacuum bag 3 at resin input port 29, which is physically located beneath said FASTRAC layer 13 through a tapered interface 27 (see FIG. 5 for a more detailed view). Formation of these FASTRAC channels 18 in the primary vacuum bag 3 is what allows the resin to quickly and efficiently flow across, and with the assistance of primary vacuum line 23 through the thickness of, preform 5 once resin infusion is initiated through the resin supply port 29. By varying the amount of vacuum draw applied via the secondary vacuum line 15 using secondary vacuum control valve 16 it is possible to control the size and shape of the channels 18 formed in the primary vacuum bag 3, and hence, control the surface flow rate of the resin.

After resin infusion of preform 5 is complete, secondary vacuum line 15 is deactivated and FASTRAC layer 13 removed while still maintaining vacuum draw through the primary vacuum line 23. This allows the FASTRAC resin feed channels 18 formed by the primary vacuum bag 3 to collapse, the vacuum bag 3 to collapse against the preform 5 surface and the preform 5 can then be cured in a conventional fashion. Once cure is complete, the primary vacuum bag 3 is removed. The FASTRAC process of the present invention eliminates the presence of feed channels 18 formed in the primary vacuum bag 3 once resin infusion is completed, but prior to cure, so as to provide a preform having a smooth surface or having a surface that does not retain the shape of the FASTRAC channels 18. The FASTRAC layer 13 may be reused.

A unique feature of the present invention is the ability to control resin flow front velocity by varying the amount of vacuum applied, via the secondary vacuum line 15, between the FASTRAC layer 13 and the primary vacuum bag 3. If the resin is flowing too rapidly into the preform 5, the vacuum draw of secondary vacuum line 15 may be decreased via valve 16 so as to reduce the channeling effect that it creates in the primary vacuum bag 3. This reduces the rate of flow of the resin to the preform 5.

The apparatus of the present invention may optionally employ resin flow sensors 31 throughout preform 5 to detect the presence or absence and location of resin in the preform 5 and to help control/steer the resin flow front during impregnation of the preform 5. A flow diagram describing a sample step-by-step method within the scope of the present invention wherein resin flow sensors 31 are employed is set forth in FIG. 3. Reference to the apparatus as set forth in FIG. 2 are made to describe the flow diagram.

Figure 3:
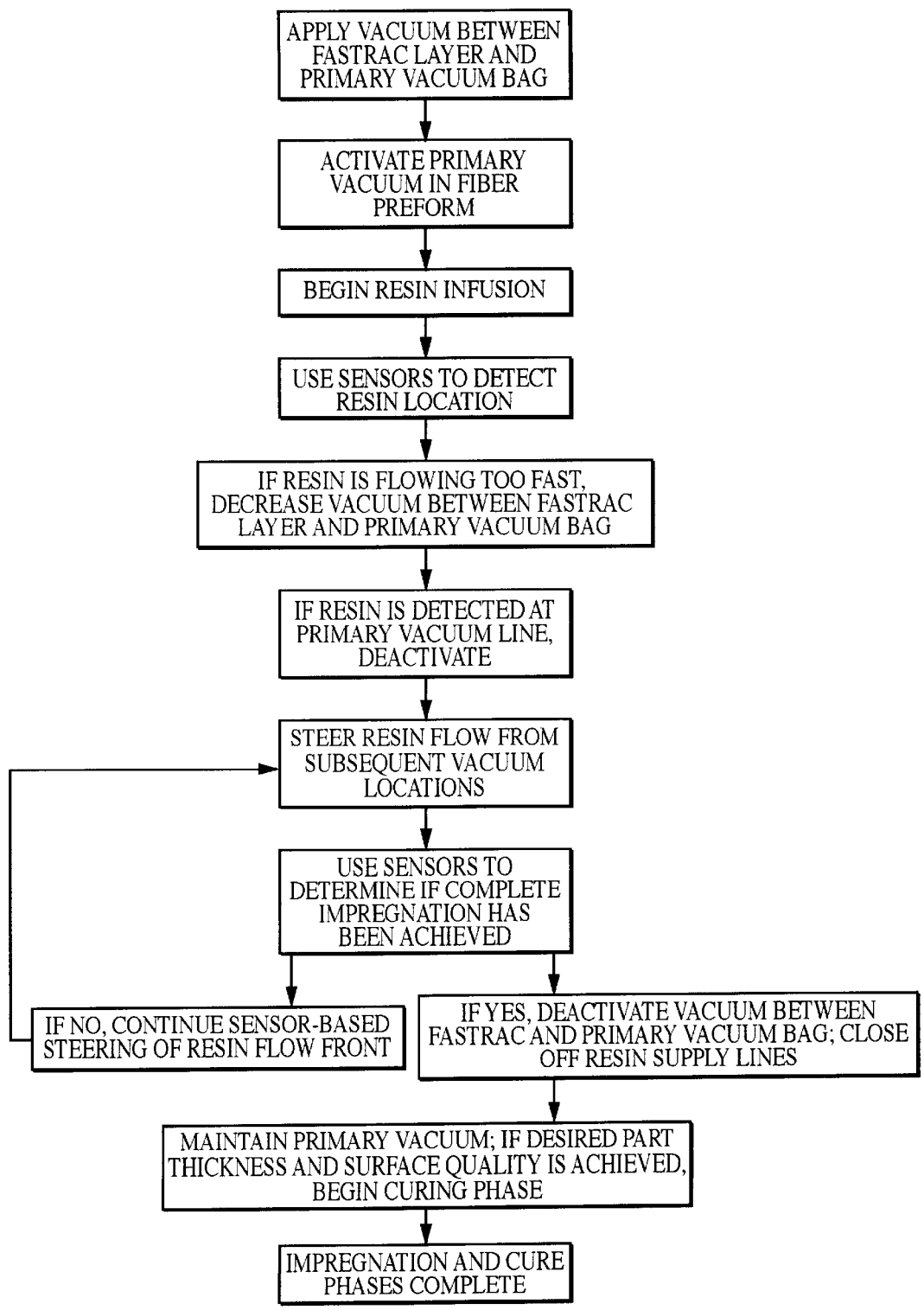
FIG. 3 is a flow diagram describing a sample step-by-step method within the scope of the present invention wherein multiple resin flow sensors and individually sensor controlled vacuum lines are employed. The method is set forth from the step of applying a vacuum between the FASTRAC layer and the primary vacuum bag to the complete impregnation and cure of a fiber reinforced preform.

In the process set forth by the flow diagram in FIG. 3, the secondary vacuum line 15 is first activated, followed by activation of the primary vacuum line 23. Resin infusion is begun via resin port 29 and sensors 31 used to detect resin location. A unique feature of the invention is the ability to control the surface resin flow front velocity by varying the amount of vacuum applied via secondary vacuum line 15 between the FASTRAC layer 13 and the primary vacuum bag 3. If the resin is flowing too rapidly, the vacuum draw created by secondary vacuum line 15 is decreased so as to slow the resin flow. If resin is detected, for instance, by the sensors 31 at the primary vacuum line 23, the primary vacuum line 23 may be deactivated and resin flow may be steered to other areas of the preform 5 using auxiliary vacuum lines 39. Resin flow sensors 31 are also used to determine if complete resin impregnation of preform 5 has been achieved. If it is determined that complete resin impregnation has been, in fact, achieved, the secondary vacuum line 15 is deactivated and the resin supply port 29 closed. With the primary vacuum line 23 still operating, curing of the resin impregnated fiber containing preform 5 may be initiated using conventional means. The primary vacuum line 23 is maintained until the resin impregnated fiber containing preform 5 achieves the desired properties including surface quality. Once the cure phase is complete, the primary vacuum bag 3 is removed.

As can be seen by the process described, the sensors 31 assist in not only detecting the flow of the resin, but also in controlling/steering the resin flow front during the impregnation of the preform 5. This may be accomplished with the assistance of multiple, individually sensor controlled, auxiliary vacuum lines 39 positioned on the tool surface 7, for example. These auxiliary vacuum lines 39 serve to minimize fill time and minimize accumulated resin waste in vacuum trap 47. The sensors 31 detect the location of the resin flow front and subsequently actuate valves to open and close the auxiliary vacuum lines 39 as needed to draw resin to dry areas within the preform 5. This may be accomplished using a computer-based control system 37 connected to a vacuum pump 35 and computer controlled pressure accumulator 33 (used to ensure fast resin supply to FASTRAC resin input and to rapidly relax the FASTRAC channels 18 formed in the primary vacuum bag 3). Types of sensors that may be employed include fiber optic sensors, ultrasonic sensors, wave guide sensors, dielectric sensors, micro-dielectric sensors, SMARTWEAVE-type sensors (see U.S. Pat. No. 5,210,499, issued May 11, 1993, the description of the sensors therein is incorporated herein by reference), etc. LabView, manufactured by National Instruments, is a commercial software system which can be used to develop a sensor-based control system that would selectively direct the operation of the vacuum ports described by the present invention. Vacuum traps of the type manufactured by Binks may be employed as well. One having ordinary skill in the art would be able to implement the use of different sensors and to monitor the flow of resin in the practice of the present invention and to direct resin flow front so as to optimize resin impregnation throughout the preform 5.

Figure 4A:
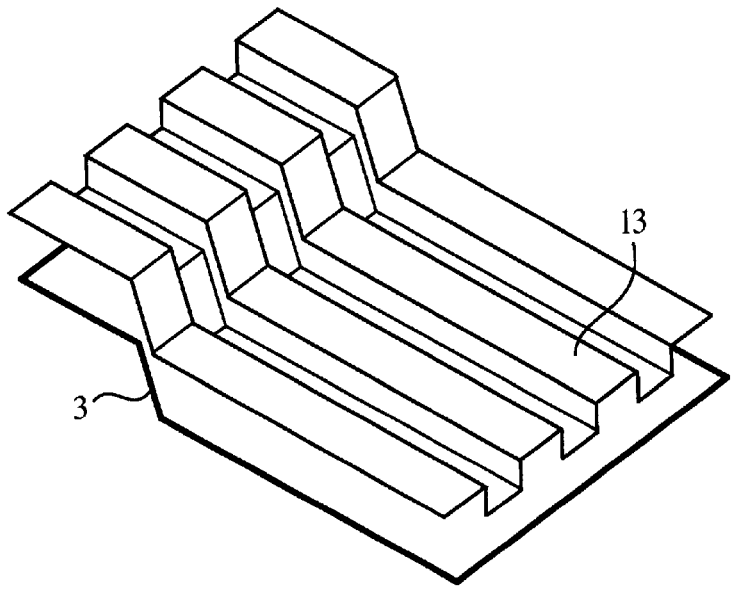
FIG. 4a illustrates a FASTRAC layer positioned on a primary vacuum bag (secondary vacuum line not activated there between).
Figure 4B:
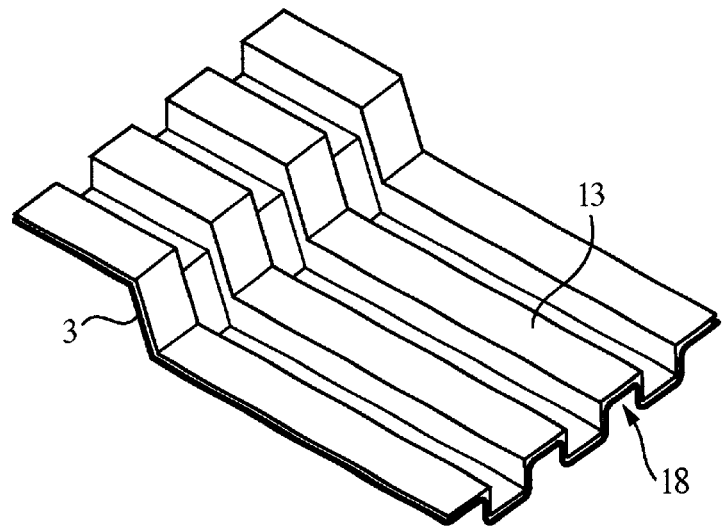
FIG. 4b illustrates the FASTRAC layer positioned on a primary vacuum bag wherein a vacuum is applied between the FASTRAC layer and the primary vacuum bag (secondary vacuum line is fully activated).

FIG. 4(a) illustrates a FASTRAC layer 13 positioned on a primary vacuum bag 3 prior to activation of a secondary vacuum line (not shown). Activation of a secondary vacuum between said FASTRAC layer 13 and the primary vacuum bag 3 causes channels 18 to be formed in the primary vacuum bag 3 as illustrated in FIG. 4(b). By varying the amount of vacuum applied via the secondary vacuum, it is possible to control the size of the channels 18 formed in the primary vacuum bag 3 and, hence, control the surface flow rate of the resin.

Figure 5A:
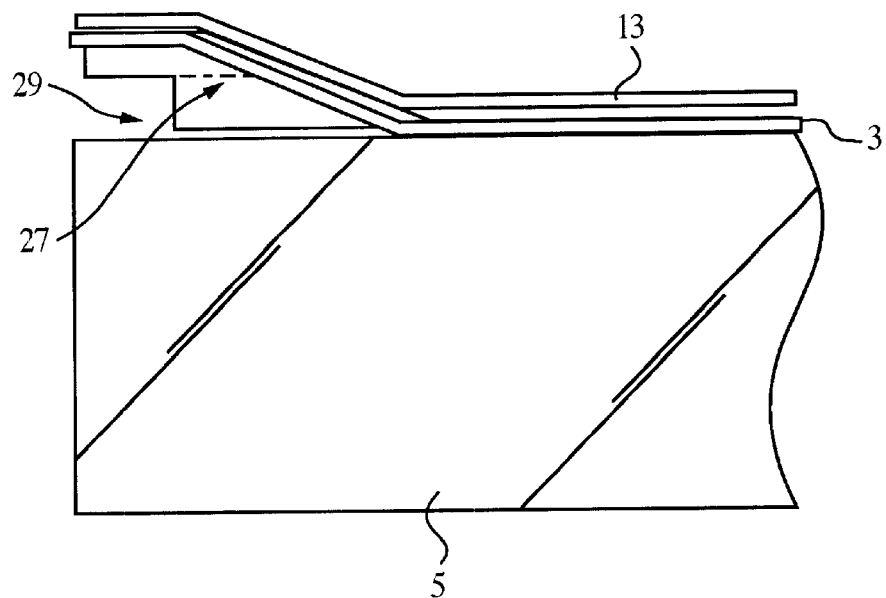
FIG. 5a illustrates a side view of the resin supply directed into a tapered interface.
Figure 5B:
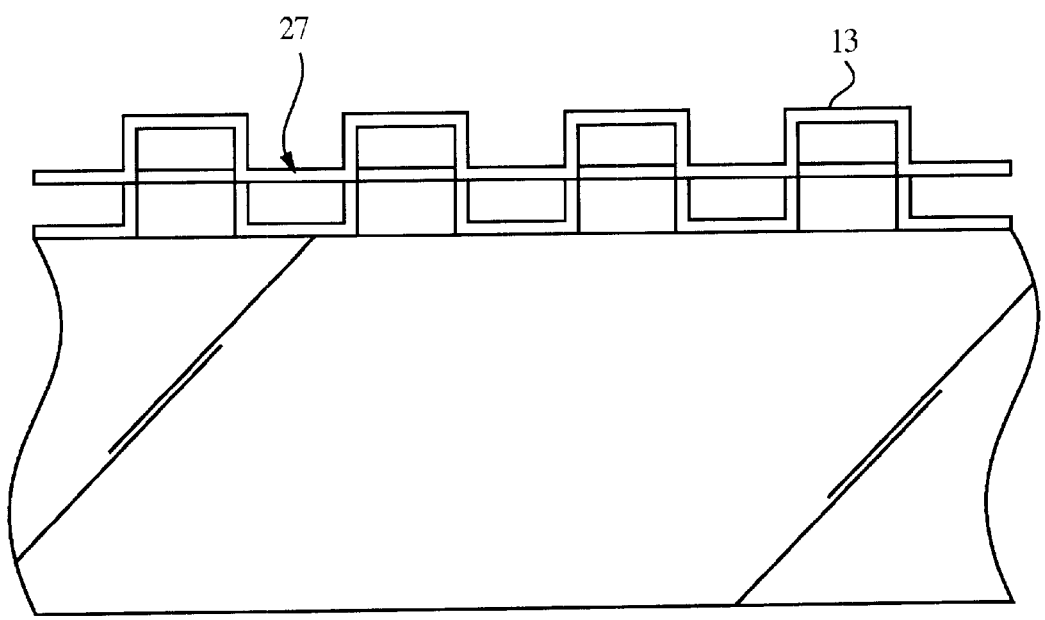
FIG. 5b illustrates a front view of the same.

FIGS. 5(a) and 5(b) provide a detailed view of the resin supply interface in relation to the FASTRAC layer 13 and the primary vacuum bag 3 positioned on top of a fiber containing preform 5. The tapered interface 27 allows the FASTRAC channels to properly develop and promote the resin flow beneath the primary vacuum bag 3 and to fiber containing preform 5. As shown in FIG. 5(a), the resin supply is directed into the tapered interface 27 via resin supply port 29, which is positioned beneath FASTRAC layer 13 and facilitates the flow of resin beneath primary vacuum bag 3 and onto, into and through preform 5. FIG. 5(b) illustrates a front view of the FASTRAC layer 13 in relation to tapered interface 27.

Figure 6A:
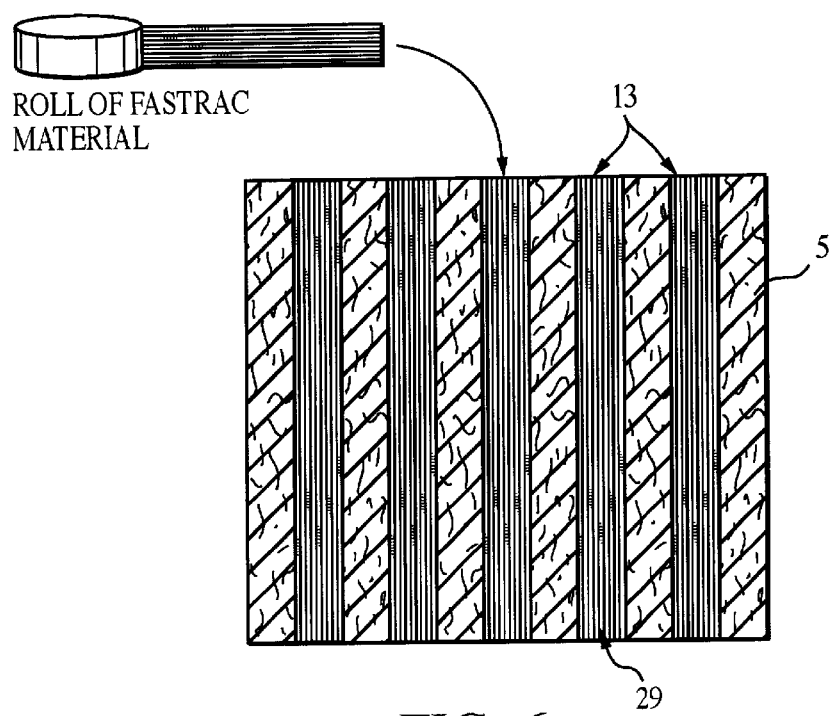
FIG. 6(a) illustrates an application of FASTRAC layers to a preform prior to resin impregnation (note illustration of parallel FASTRAC channels in the FASTRAC layer; primary vacuum bag which is present between FASTRAC layer and preform is not depicted here so that resin flow patterns beneath a primary vacuum bag and across the preform may be illustrated).
Figure 6B:
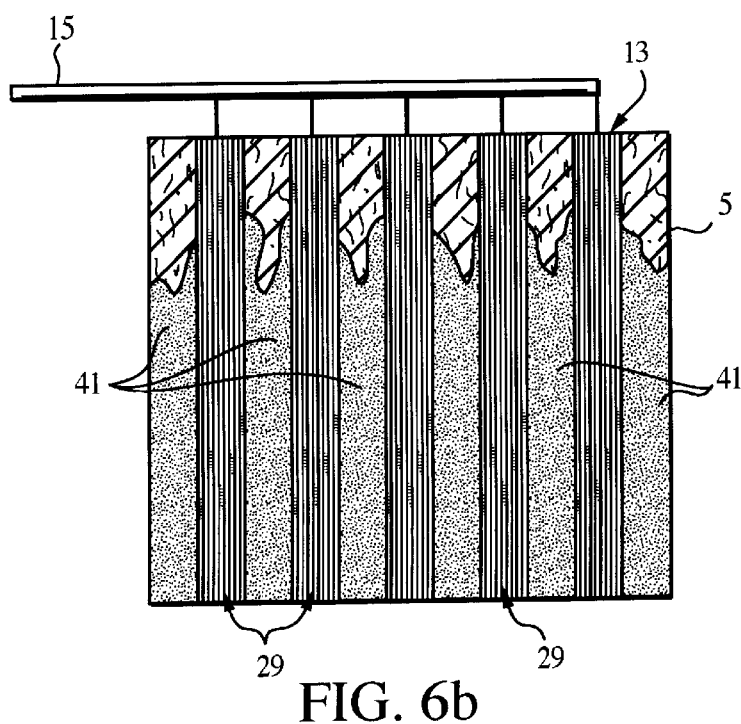
FIG. 6(b) illustrates resin flow paths developed using the FASTRAC channels.

The flow of resin can be illustrated by reference to FIG. 6(a) and FIG. 6(b). FIG. 6(a) illustrates the position of FASTRAC layers 13 on top of primary vacuum bag (not illustrated so that one may view the fiber containing preform so as to view resin flow) prior to initiation of resin flow via resin in ports 29. With both vacuum lines 15 and 23 (not shown) activated, resin is infused into primary vacuum bag 3 (not shown in FIGS. 6(a) and 6(b)) beneath FASTRAC layers 13 through resin in ports 29. Secondary vacuum lines 15 are positioned beneath FASTRAC layers 13, between FASTRAC layers 13 and the primary vacuum bag, to facilitate resin flow across the fiber containing preform 5. A schematic view of the direction of resin flow 41 during impregnation of preform 5 is illustrated in FIG. 6(b).

Figure 7:
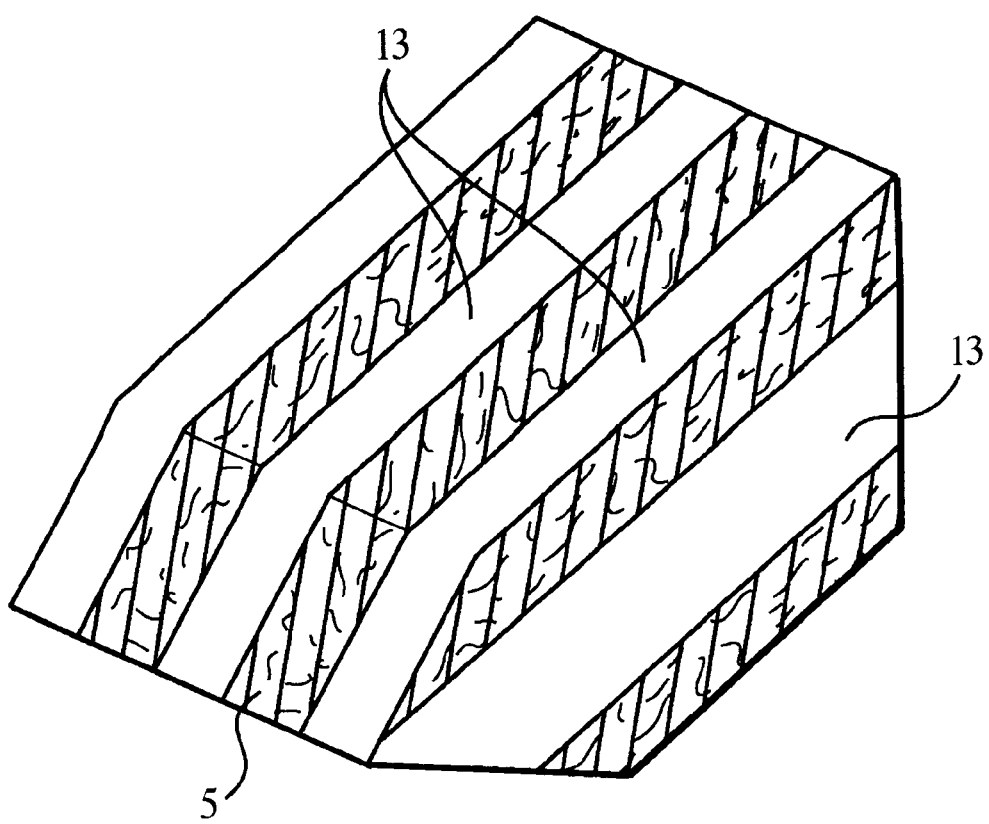
FIG. 7 illustrates an application of the present invention on a three-dimensional fiber reinforced preform. A primary vacuum bag (not illustrated) covers the preform beneath the FASTRAC layers.

FIG. 6 further demonstrates how the present invention can be rapidly deployed by using a roll of manufactured stock material having already formed channels therein as the FASTRAC layer 13. Particularly unique is the ability to formulate the FASTRAC channels in the primary vacuum bag 3 at desired spaced intervals atop the preform 5. This permits the desired resin flow path 41 to develop in the preform 5 both beneath and between the FASTRAC layers 13. This feature is particularly helpful in implementing resin flow channels over larger, complex, 3-dimensional structures as shown in FIG. 7.

In employing the present invention, one or more FASTRAC layers 13 may be employed. The use of more than one FASTRAC layer 13 is illustrated in FIGS. 6 and 7. FIG. 6 is a two-dimensional representation of application of more than one FASTRAC layer 13 on preform 5; while FIG. 7 illustrates an application of more than one FASTRAC layers 13 on a three-dimensional fiber reinforced preform 5. Note that the FASTRAC layers 13 may be employed on more than one side of a preform 5.

Figure 8:
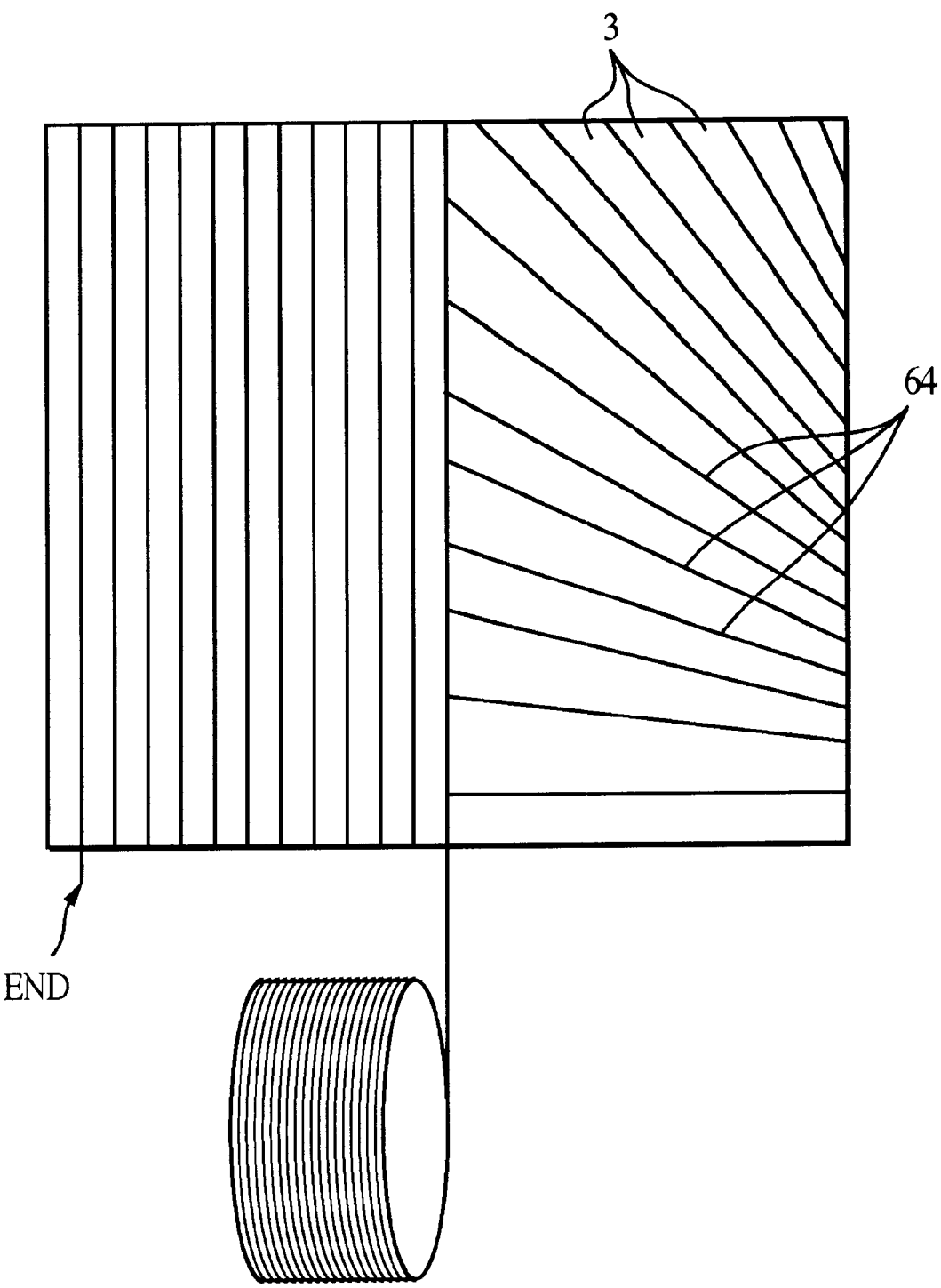
FIG. 8 illustrates an alternative method for forming FASTRAC channel patterns employing continuous cords.

FIG. 8 presents an alternative method for forming unique FASTRAC channel patterns by using a series of continuous cords 64, as the FASTRAC layer, sandwiched between a semi rigid layer such as a second vacuum bag (not shown) and the primary vacuum bag 3. The cords 64 are placed over the primary vacuum bag 3 so as to create a uniquely generated pattern. A second vacuum bag, such as illustrated in FIG. 1 as element 20, is then placed over the cords 64 so as to form a pocket within which a secondary vacuum may be applied so as to pull the primary vacuum bag 3 around the cords and thereby create FASTRAC channels, the sides of which consist of the cords 64 and the semi rigid layer.

Figure 9:
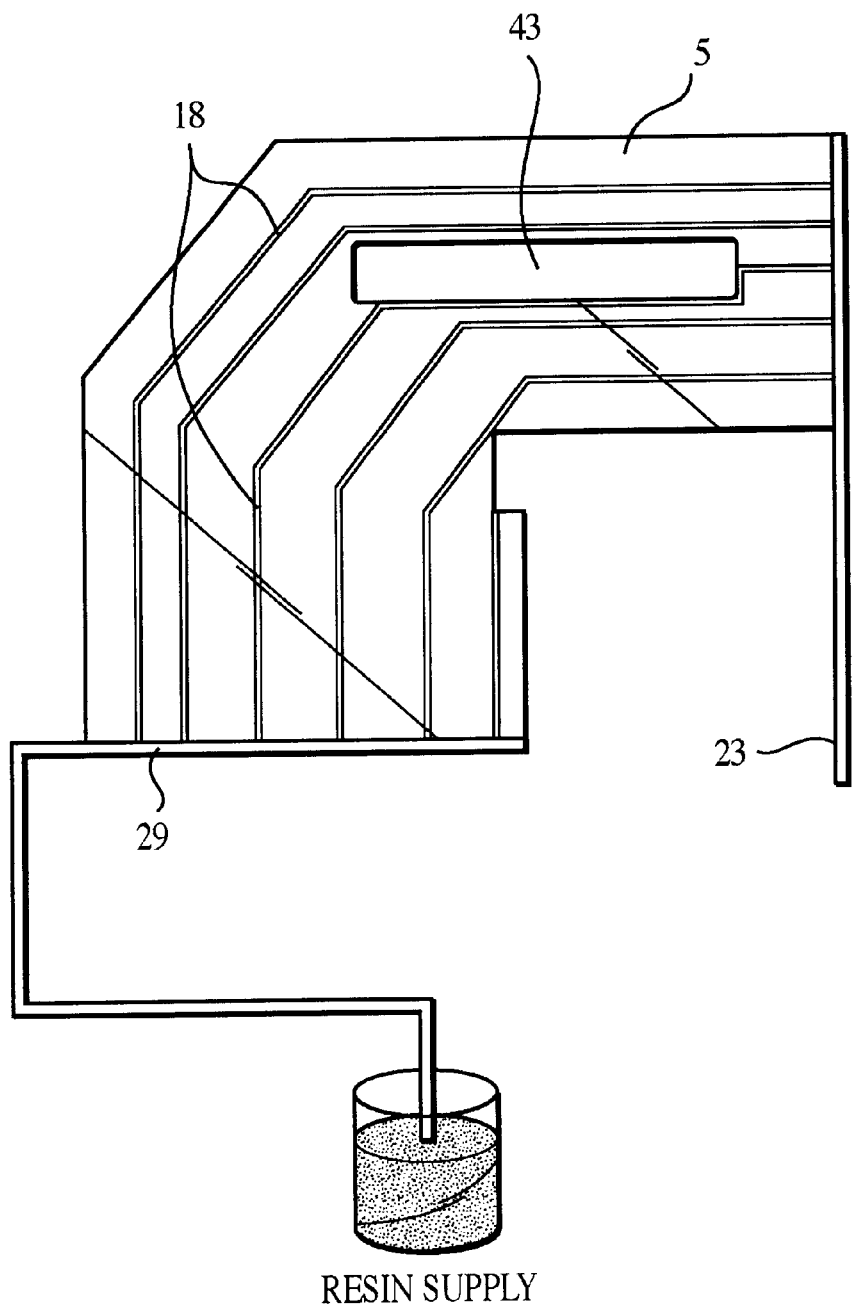
FIG. 9 illustrates use of the present invention to optimize resin paths using customized FASTRAC channels.

The FASTRAC layer may be customized so as to optimize resin flow paths when impregnating a fiber containing preform having specific structural requirements. FIG. 9 illustrates a preform 5 wherein customized FASTRAC channels 18 are created using the present invention so as to accommodate the structural dimensions of preform 5. In this particular illustration, the FASTRAC layer employed may be a panel having the shape of preform 5 in which channels 18 are present as shown. Note that in order to accommodate cut-out 43 in preform 5, no channels are present at that location. The present invention allows optimal resin flow around objects containing cut-outs and inserts. Resin is supplied to preform 5 via resin supply line 29 and primary vacuum line 23 employed to facilitate resin flow across preform 5.

Any method for selecting the type and dimensions of FASTRAC layers to employ when exercising the present invention may be used. One may, for example, employ the use of a computer to help in the selection. For instance, in determining how wide and how deep the channels should be, as well as how the channels should be aligned with the geometry of the preform, a finite element-based computer model which simulates the flow of polymer resin during impregnation of the preform may be used. The computer model, for instance, may account for variables such as resin viscosity (e.g., high viscosity resins typically require deeper and wider channels), as well as variations in the preform permeability. Once the model is used to select the optimal design for the channels, a computer-based instruction set can be sent to a numerically controlled machining system to fabricate the optimal FASTRAC layer having therein the optimal FASTRAC channel pattern. The use of a computer process model is not required in the practice of the present invention; it may, however, be helpful in optimizing the performance.

One having ordinary skill in the art with knowledge of the description of the invention provided will be able to select or customize a resin channeling means to meet their needs in preparing fiber reinforced polymer composite articles.

The apparatus and method of the present invention may employ one or more (1) FASTRAC layers, (2) resin supply ports; (3) primary vacuum lines, and (4) secondary vacuum lines. The apparatus and method of the present invention may optionally employ one or more (1) resin flow sensors and (2) auxiliary vacuum lines. One having ordinary skill in the art with knowledge of the description provided will be able to determine the number of FASTRAC layers, resin supply ports, etc. to employ in the practice of the present invention in order to achieve and optimize the desired outcome.

Most VARTM polymer resin systems can accommodate resin viscosity ranges from approximately 50–300 centipoise. The present invention, however, can accommodate resins having viscosities as high as 2,500 centipoise.

The present invention may be further described by way of example; however, the examples set forth below in no way are to be construed as limiting the scope of the invention herein.

EXAMPLE 1

This example demonstrates the ability of the present invention to impregnate a fibrous structure with a highly viscous resin, Adiprene L-100 (polyurethane resin, manufactured by Uniroyal, Inc.). Adiprene L-100 has a viscosity of 2200 cps at an elevated processing temperature of 140° F. The viscosity of Adiprene L-100 is nearly an order of magnitude greater than the typical viscosity of resins employed in traditional VARTM type processes.

Figure 10A:
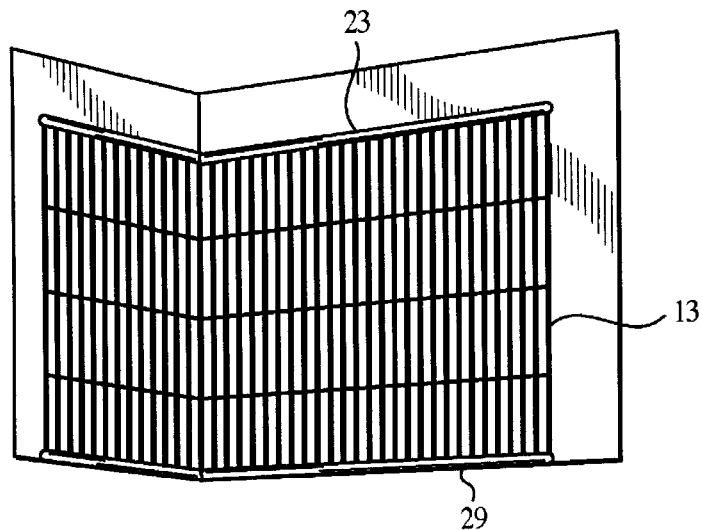
FIG. 10 illustrates the installation and use of the FASTRAC system employed in Example 1.
Figure 10B:
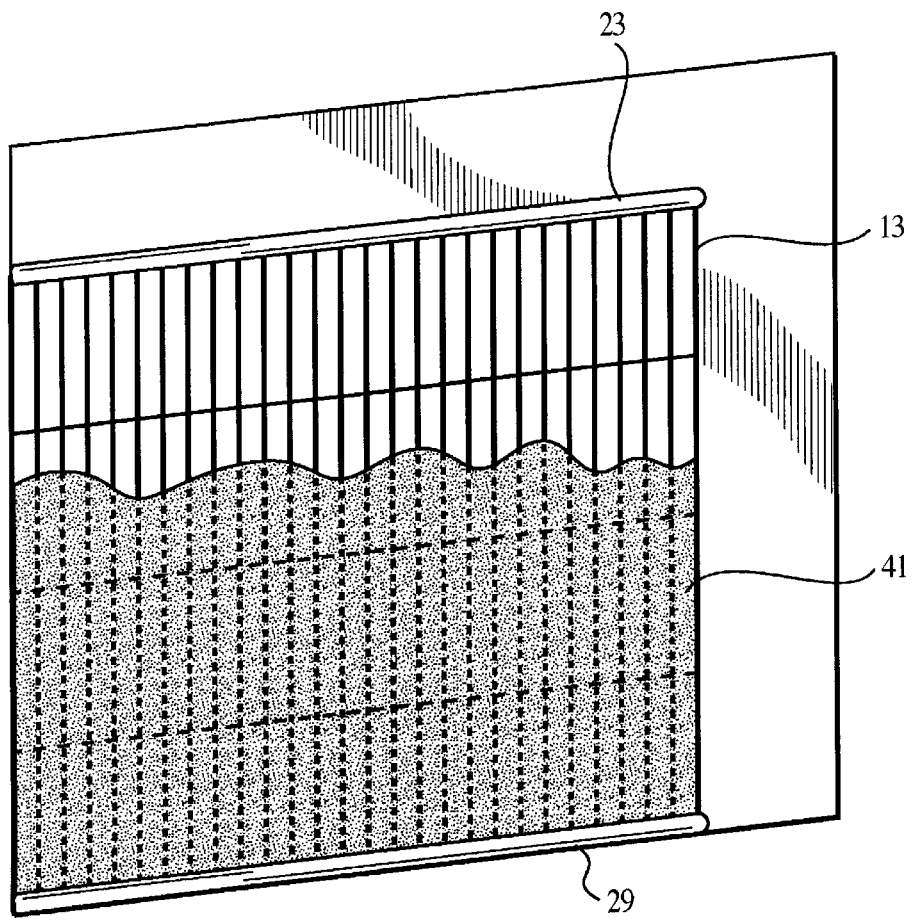

Based on semi-empirical channel flow data, it was determined that use of FASTRAC channels having a width of approximately 0.7"–1.0" and depth of approximately 0.25" would be appropriate to employ in the resin impregnation process of a 42"×34"×16" preform composed of ten (10) layers of 5×4 E-glass, 24 ounce woven roving processed in a walk-in oven at 140° F. FASTRAC layers were used that would provide FASTRAC channels having the dimensions described above. In this particular example, two FASTRAC layers were used—one having the overall dimension of 42"×34" and the other having the overall dimension of 34"×16". The distance between channels was approximately 1.0" using these FASTRAC layers. These FASTRAC layers are illustrated in FIG. 10($a$). The channels run vertically. The horizontal lines that appear in the figure are not part of the FASTRAC layer—they are tape. During the impregnation of the preform, the vacuum draw in the primary vacuum bag was approximately 28" Hg; and the vacuum draw in the secondary vacuum bag employed slightly higher. One resin feed line was employed to impregnate the preform with the Adiprene L-100. FIG. 10($b$) illustrates impregnation of the part with the resin and the direction of resin flow from the bottom up. Full wet out, complete resin impregnation of the preform, was achieved within 140 minutes.

This example was performed twice using the polyurethane resin. In the first experiment, the channels were formed using FASTRAC layers constructed from silicone strips. In the second experiment, polypropylene cord was employed as the FASTRAC layer. Impregnation of the preform employed herein with Adiprene L-100 would not be possible using the conventional VARTM processes of the prior art unless an impractical number of individual resin feed lines were employed.

EXAMPLE 2

This example demonstrates the ability to impregnate a 4-foot long panel using the apparatus and process of the present invention wherein a single resin feed line is employed. The general rule of thumb used in commercial VARTM processes is to position a resin feed line approximately every 18 inches. This stems from Darcy's Law which applies in traditional VARTM processes such as SCRIMP. Because of the constant pressure drop, the flow rate decays rapidly due to the cumulative resistance of the resin viscosity and fabric permeability. Installation of multiple resin line sources to overcome this, however, increases the overall set-up costs and increases the likelihood of "trapping" dry spots due to premature resin injection from sources in front of the advancing resin flow. By contrast, the FASTRAC process creates a rapid flow path for the surface resin to follow, thus minimizing the time necessary for the resin to reach the uppermost vacuum line. The advantages of the FASTRAC process is demonstrated by this example.

Figure 11A:
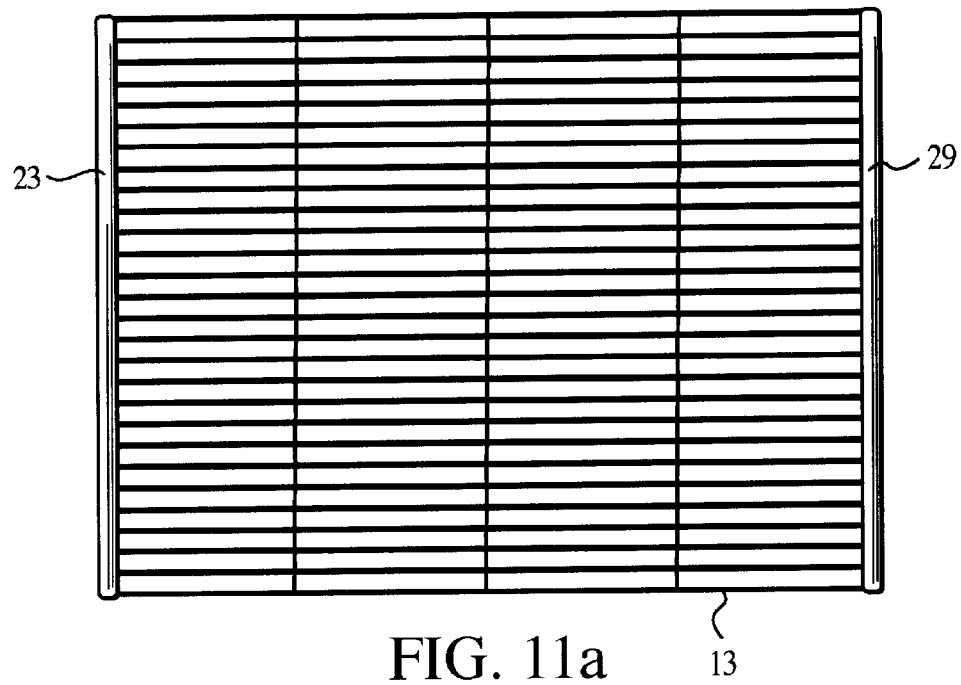
FIG. 11(a) illustrates the FASTRAC apparatus employed in Example 2. Flow front of resin during the impregnation process is marked and shown in FIG. 11(b).
Figure 11B:
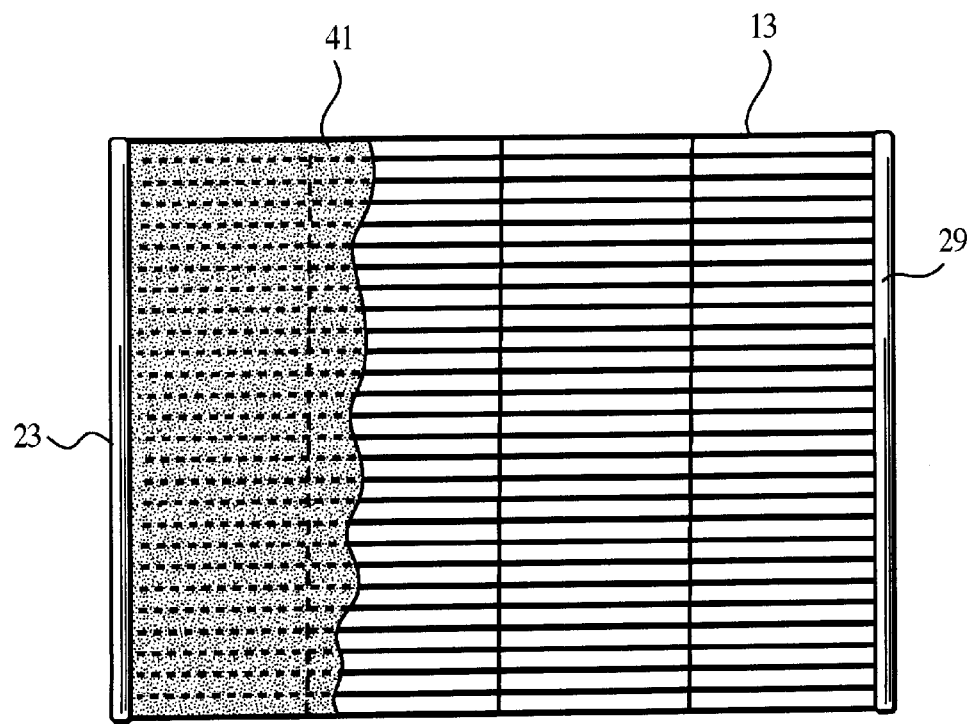

A 4-foot long, 1-foot wide and 0.5 inch thick panel with 22 plies of 24 ounce 5×5 S2 glass woven roving was fabricated using a single resin feed line located at one end of the panel. The apparatus set up used in this example, is illustrated in FIG. 11(a). The FASTRAC layer used was 4-foot×1-foot having hemi-spherical shaped channels that were approximately 0.5" wide and approximately 0.25" deep. The panel was impregnated with SC-15 epoxy manufactured by Applied Polymerics, Inc. The surface resin flow front filled the entire surface layer of the panel in approximately three (3) minutes. It took an additional 31 minutes for the resin to flow through the thickness of the panel to achieve complete impregnation.

An attempt was made to impregnate an identical panel using the traditional VARTM SCRIMP process. Using this traditional VARTM process, the resin flow front stalled at approximately 21 inches from the resin source. Vacuum levels employed in the SCRIMP process and in the process of the present invention were the same—28" Hg.

The present invention provides a means to increase the speed and efficiency at which resin impregnation of a fiber containing preform occurs. Typically, the preform and the distribution medium of the prior art exhibit Darcy-like flow. Because the distribution medium tends to be more permeable than the fibrous preform to be impregnated, it creates a preferential flow path for the resin which in essence accelerates the rate of impregnation of the preform with said resin. The FASTRAC process of the present invention, on the other hand, exhibits channel-like flow patterns due to the nature in which FASTRAC creates resin flow paths for the resin. This allows for a much quicker impregnation of the surface of the preform and subsequently the preform itself.

The present invention has numerous advantages over previous vacuum assisted resin transfer molding techniques. Some of these advantages include (1) reusable resin channeling means (FASTRAC layer); (2) channels created for resin distribution using channeling means (FASTRAC layer) which are employed outside of the primary vacuum bag (channeling means do not come into direct contact with resin or preform—no resin contamination of FASTRAC layer); (3) FASTRAC channels formed may be eliminated after resin impregnation is complete and prior to curing process so as to provide smooth surface on cured fiber-reinforced article; (4) ability to control the velocity of resin flow by varying the vacuum applied via the secondary vacuum line; and (5) faster overall impregnation cycle given the increased pressure differential. These and other advantages translate into decreased labor costs and reduced material waste. Overall, the present invention provides a less expensive, faster and more efficient process for the manufacture of fiber-reinforced polymer composite articles using vacuum assisted resin transfer molding technology.

One having ordinary skill in the art will recognize the time and material saving in using the FASTRAC process of the present invention as compared to the use of conventional VARTM processes.

While particular embodiments of the invention have been shown and described, it will be obvious to those skilled in the art that changes and modifications may be made without departing from this invention. Therefore, it is intended that the claims herein are to include all such obvious changes and modifications as fall within the true spirit and scope of this invention.

I claim:

1. A method for the production of fiber-reinforced resin structures comprising
    creating a fiber containing preform having desired dimensions and properties;
    placing a fluid impervious flexible sheet containing a resin port therein on said fiber reinforced preform and sealing it around said fiber containing preform so as to form a chamber containing said preform;
    positioning a resin channeling means on said fluid impervious flexible sheet, exterior to said chamber;
    forming a pocket between or around said resin channeling means and said fluid impervious flexible sheet to which a vacuum may be applied;
    applying a secondary vacuum to said pocket so as cause formation of channels on said fluid impervious flexible sheet;
    activating a primary vacuum to said chamber containing said fiber containing preform;
    infusing resin into said chamber containing said fiber-containing preform via said resin port;
    deactivating said secondary vacuum when said fiber containing preform has been impregnated with resin as desired so as to eliminate said channels formed;
    curing said resin-containing preform;
    deactivating said primary vacuum when said curing is complete; and
    removing said fluid impervious flexible sheet from said cured, resin containing preform.

2. The method of claim 1, wherein said pocket between or around said resin channeling means is formed by sealing the perimeter of said resin channeling means to said fluid impervious flexible sheet.

3. The method of claim 1, wherein said pocket between or around said resin channeling means is formed by placing a fluid impervious flexible sheet that does not contain a resin port therein over said resin channeling means and said fluid impervious flexible sheet containing said resin port and sealing it so as to provide said pocket.

4. The method of claim 1, wherein said method further comprises detecting and monitoring the resin flow within said fiber containing preform.

5. The method of claim 4, wherein resin flow sensors are employed to detect and monitor said resin flow within said fiber-containing preform.

6. The method of claim 1, wherein said method further comprises adjusting resin flow to said fiber containing preform as needed by adjusting the vacuum draw applied by secondary vacuum to said pocket.

7. The method of claim 1, wherein said method further comprises adjusting resin flow to said fiber containing preform by employing one or more auxiliary vacuum lines positioned so as to apply vacuum draw as needed at various locations within said fiber-containing preform.

8. The method of claim 1, wherein said method further comprises adjusting the size and shape of said channels so as to optimize resin flow to said fiber containing preform by adjusting the vacuum draw applied by said secondary vacuum.

9. A method for the production of preform reinforced resin structures, comprising:
    sealing a flexible sheet around a preform to form a chamber having a resin port and containing the preform;
    positioning a resin channeling means on the flexible sheet and exterior to the chamber to form a pocket between the resin channeling means and the flexible sheet;
    applying a vacuum to the pocket to draw the flexible sheet against the resin channeling means to form channels within the chamber;

applying a vacuum to the chamber containing the preform;

infusing resin into the chamber containing the preform through the resin port;

deactivating the vacuum applied to the pocket when a selected amount of resin has been infused into the chamber to diminish the channels formed within the chamber;

curing the resin infused into the chamber containing the preform;

deactivating the primary vacuum when the curing is complete; and removing the flexible sheet from the resin and preform.

10. The method of claim 9, wherein the pocket between or around the resin channeling means is formed by sealing the perimeter of the resin channeling means to the flexible sheet.

11. The method of claim 9, further comprising detecting and monitoring the resin flow within the chamber.

* * * * *